(12) United States Patent
Wesche et al.

(10) Patent No.: US 10,978,760 B2
(45) Date of Patent: Apr. 13, 2021

(54) STRUCTURAL COMPONENT, BATTERY HOUSING, AND MOTOR VEHICLE WITH SUCH A BATTERY HOUSING

(71) Applicant: Volkswagen Aktiengesellschaft, Wolfsburg (DE)

(72) Inventors: Carsten Wesche, Braunschweig (DE); Stefan Schacht, Braunschweig (DE); Henrik Fehner, Bremen (DE); Robin Gerlach, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/448,281

(22) Filed: Jun. 21, 2019

(65) Prior Publication Data
US 2019/0393460 A1 Dec. 26, 2019

(30) Foreign Application Priority Data

Jun. 21, 2018 (DE) ...................... 10 2018 210 126.4

(51) Int. Cl.
*H01M 2/10* (2006.01)
*H01M 50/20* (2021.01)
*B60L 50/64* (2019.01)
*H01M 10/42* (2006.01)

(52) U.S. Cl.
CPC ............. *H01M 50/20* (2021.01); *B60L 50/64* (2019.02); *H01M 10/425* (2013.01); *H01M 2010/4271* (2013.01)

(58) Field of Classification Search
CPC ................. H01M 2/1083; B60L 50/64; B60K 2001/0438
See application file for complete search history.

(56) References Cited

U.S. PATENT DOCUMENTS

| 2011/0189526 A1 | 8/2011 | Michelitsch et al. ......... 429/120 |
| 2013/0095359 A1 | 4/2013 | Yoshioka et al. ............... 429/99 |
| 2013/0192914 A1 | 8/2013 | Nakamori ..................... 180/68.5 |
| 2013/0270863 A1* | 10/2013 | Young ..................... B60R 16/04 296/187.12 |

(Continued)

FOREIGN PATENT DOCUMENTS

| DE | 102015111325 A1 | 1/1917 | ............. H01M 2/02 |
| DE | 102016110330 A1 | 12/1917 | ............... B60K 1/04 |

(Continued)

*Primary Examiner* — Brian L Swenson
(74) *Attorney, Agent, or Firm* — Slayden Grubert Beard PLLC

(57) ABSTRACT

The invention relates to a structural component for a battery housing of an electrically-driven motor vehicle with a wall that extends from a wall bottom side to a wall top side in a component vertical direction, and from a first end face to a second end face in a component longitudinal direction perpendicular thereto, wherein the wall has a rib arranged on one side of the wall and oriented perpendicular thereto and/or a bead to increase its flexural rigidity, and wherein the rib, or respectively the bead, extends substantially in a component longitudinal direction. Moreover, the invention relates to a battery housing for a battery of an electrically-driven motor vehicle, as well as such a motor vehicle.

21 Claims, 4 Drawing Sheets

(56) References Cited

U.S. PATENT DOCUMENTS

| | | | |
|---|---|---|---|
| 2014/0182958 A1 | 7/2014 | Rawlinson et al. | 180/68.5 |
| 2015/0166109 A1* | 6/2015 | Eberle | B60R 19/18 |
| | | | 180/232 |
| 2016/0118635 A1* | 4/2016 | Keller | H01M 2/1077 |
| | | | 429/156 |
| 2016/0268560 A1* | 9/2016 | Hascoet | H01M 10/0481 |
| 2017/0305248 A1 | 10/2017 | Hara et al. | |
| 2017/0355255 A1* | 12/2017 | Brausse | B62D 27/023 |
| 2018/0186227 A1* | 7/2018 | Stephens | H01M 2/1083 |
| 2018/0212216 A1* | 7/2018 | Handing | H01M 10/625 |
| 2019/0131602 A1 | 5/2019 | Hilfrich et al. | |
| 2019/0312247 A1* | 10/2019 | Hilmann | H01M 2/202 |
| 2020/0180417 A1* | 6/2020 | Marquez Duran | B60K 1/04 |

FOREIGN PATENT DOCUMENTS

| | | | |
|---|---|---|---|
| DE | 102016213832 A1 | 2/1918 | H01M 10/6556 |
| DE | 112009002351 T5 | 1/2012 | H01M 10/04 |
| DE | 102016209853 A1 | 12/2017 | H01M 2/02 |
| GB | 2555826 A | 5/2018 | B60K 1/04 |
| WO | 2008/093219 A1 | 8/2008 | H01M 2/02 |

\* cited by examiner

STRUCTURAL COMPONENT, BATTERY HOUSING, AND MOTOR VEHICLE WITH SUCH A BATTERY HOUSING

CROSS-REFERENCE TO RELATED APPLICATIONS

This application claims priority to German Patent Application No. DE 10 2018 210 126.4, filed on Jun. 21, 2018 with the German Patent and Trademark Office. The contents of the aforesaid application are incorporated herein for all purposes.

TECHNICAL FIELD

The invention relates to a structural component for a battery housing of an electrically-driven motor vehicle. Moreover, the invention relates to a battery housing for a battery of an electrically-driven motor vehicle, as well as such a motor vehicle.

BACKGROUND

An electrically-driven motor vehicle typically has a battery (traction battery), which provides an electrical engine for driving the motor vehicle with energy. An electrically-driven motor vehicle should in particular be understood to mean an electric vehicle which stores the energy needed for driving solely in the battery (BEV, battery electric vehicle), an electric vehicle comprising a range extender (REEV, range extended electric vehicle), a hybrid vehicle (HEV, hybrid electric vehicle) and/or a plug-in hybrid vehicle (PHEV, plug-in hybrid electric vehicle).

An application of force, in particular caused by by an accident, i.e., by a crash or an impact, may result in damage to the battery. In the event of such damage, the energy stored in the battery may for example be released in an explosive manner. Furthermore, the risk of fire and/or hazards resulting from an electrical discharge of the battery may arise for the vehicle passengers (occupants).

To avoid damage to the battery, (reinforcing) elements are arranged for example in a housing interior of the battery housing that increase rigidity of the housing and are to prevent deformation of the battery housing in the housing interior.

For example, a battery housing part for a traction battery of a vehicle is known from DE 10 2015 111 325 A1 that has an electric motor drive. The battery housing part has a seat body in which the traction battery can be accommodated. In this case, the seat body consists of a thermoplastic plastic that comprises at least one integrated organosheet component. It is furthermore provided that the organosheet component has a bottom section and at least one reinforcing section running perpendicular to the bottom section.

DE 10 2016 110 330 A1 discloses a housing for a vehicle battery. The housing has a cover plate and a base plate, a frame connected to the cover plate and base plate being arranged therebetween. In this case, at least one cross member element is arranged in the space enclosed by the frame.

SUMMARY

AN object exists to provide a structural component suitable for protecting a battery accommodated in a battery housing from an external application of force and from potential damage associated therewith. Moreover, a battery housing having such a structural component and a motor vehicle having such a battery housing are discussed.

This object is solved according to the invention by a structural component, by a battery housing, and by an electrically-driven motor vehicle having the features of the independent claims. Embodiments are discussed in the dependent claims and the following description.

In one aspect, a structural component for a battery housing of an electrically-driven motor vehicle is provided with a wall that extends from a wall bottom side to a wall top side in a component vertical direction, and from a first end face to a second end face in a component longitudinal direction perpendicular thereto. The wall comprises one or more of a rib and a bead, arranged on one side of the wall and oriented perpendicular thereto to increase its flexural rigidity. The rib, or respectively the bead extends substantially in the component longitudinal direction.

The above aspect and other aspects will in the following be discussed with reference to various embodiments.

DETAILED DESCRIPTION

Figure 1:
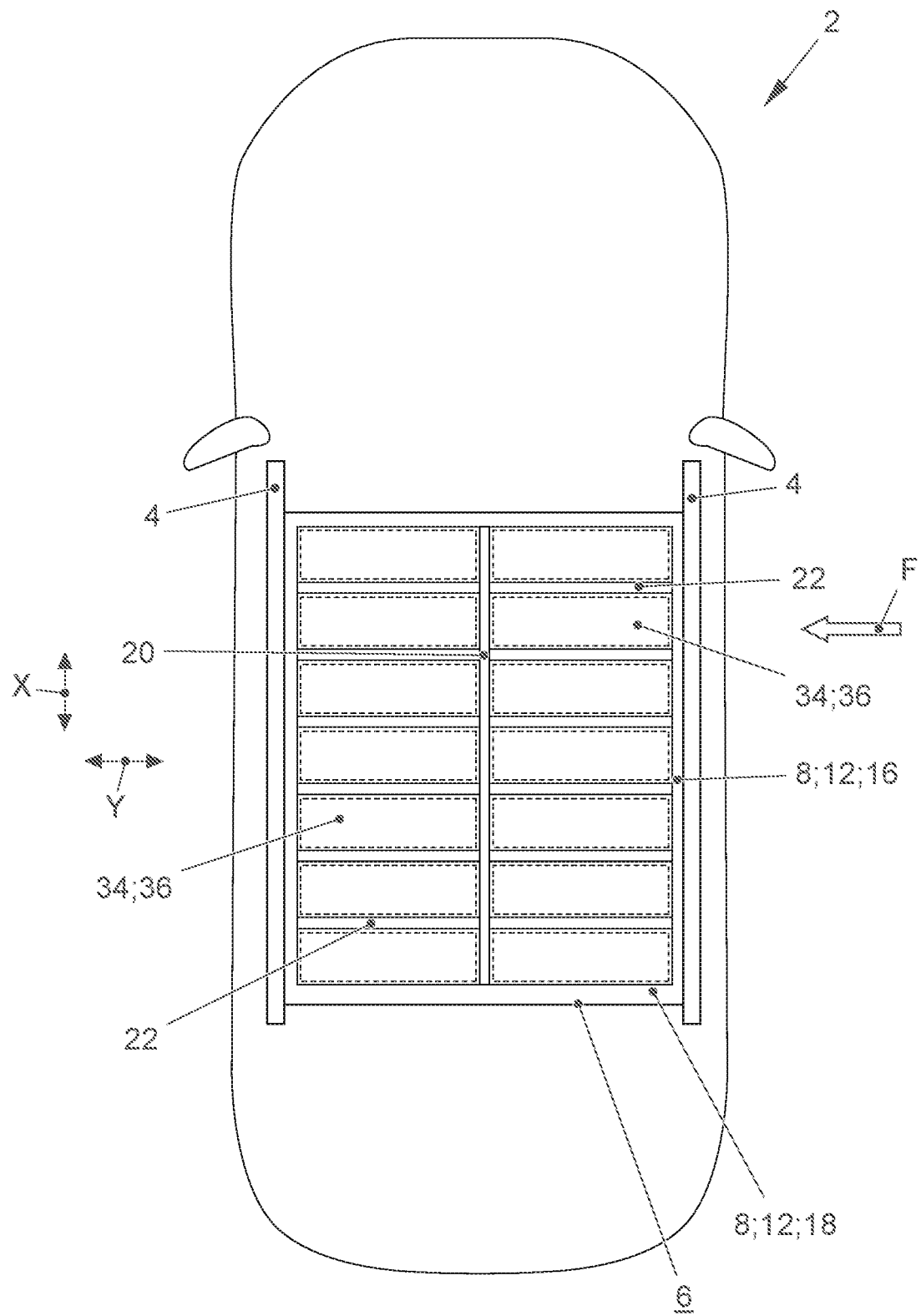
FIG. 1 shows a schematic plan view of an electrically-driven motor vehicle comprising rocker panels, between which a battery housing for a battery is arranged.

Technical features described in this application can be used to construct various embodiments of structural components, battery housings, and electrically-driven motor vehicles. Some embodiments of the invention are discussed so as to enable one skilled in the art to make and use the invention.

In one aspect, the structural component in is provided and configured for a battery housing of an electrically-driven motor vehicle. The structural component has a wall that extends from a wall bottom side to a wall top side in a component vertical direction, and from a first end face to a second end face in a component longitudinal direction perpendicular to the component vertical direction. Accordingly, the wall may have a flat extension in a plane that is spanned by the component vertical direction and the component longitudinal direction.

In some embodiments and to increase the flexural rigidity, the wall has a bead and/or a rib that is arranged on one side of the wall and is oriented perpendicular to the wall. In doing so, the rib, or respectively the bead extends substantially in the component longitudinal direction.

In some embodiments, the wall has a plurality of ribs and/or beads. In a cross-section, i.e., in a sectional plane perpendicular to the component longitudinal direction, the wall accordingly meanders due to the beads. In other words, in the cross-section, the sections of the wall running in the component vertical direction are arranged alternatingly on the outside relative to a component thickness direction perpendicular to the component vertical direction and the component longitudinal direction. The rib, or respectively the ribs, are thereby for example arranged in a bead. Also in some embodiments, the rib does not extend beyond the bead in the component thickness direction so that the extension of the wall in this direction is determined by the maximum depth of the beads.

Flexural rigidity of the wall and hence of the structural component may beneficially be increased by means of the bead, or respectively the rib. In particular, a kinking (out or in) or bending of the wall in the component thickness direction with a bending or kinking edge perpendicular to the direction of extension of the rib, or respectively the bead, i.e., substantially in the component longitudinal direction, may be prevented. In other words, bending or kinking about a bend axis that extends substantially in or opposite to the component vertical direction is prevented. This is based on the consideration that the geometrical moment of inertia, which is also referred to as the second moment of area, of the wall with respect to said bend axis is increased by means of the bead, or respectively the rib. In other words, the wall provided with the bead and/or with the rib has a comparatively high so-called Steiner component relative to the bend axis.

In some embodiments, the rib, or respectively the bead is slightly inclined at least sectionally in the component longitudinal direction, i.e., from the first end face to the second end face, toward the wall's bottom side of the wall. "Slightly inclined" in this context is understood in particular an angle of inclination between the rib, or respectively the bead and the wall bottom side greater than or equal to 10° and for example less than 45°, in particular less than 30°. Due to such an inclination of the bead, or respectively the rib, a force acting on the first end face is correspondingly conducted toward the wall's bottom side. In some embodiments, the wall's bottom side lies against a housing floor of the battery housing so that a force acting on the first end face is at least partially deflected into the battery floor, or conducted thereinto.

In summary, the structural component may act as a so-called force converter. It absorbs in particular externally introduced forces and/or deflects or conducts them. Moreover, the rib, or respectively the bead, has a double function. On the one hand, the rib, or respectively the bead, due to its inclination, causes a transmission of a force acting on the first end face of the wall toward the wall's bottom side. On the other hand, the rib, or respectively the bead serves to increase the flexural rigidity.

In some embodiments, a vertical rib is arranged on the wall, in particular molded on, and is oriented perpendicular to the wall and extends substantially in the component vertical direction. Analogous to the rib, or respectively the bead, the vertical rib may increase the flexural rigidity of the wall. In addition, the vertical rib may act as a force converter. It conducts force acting on the wall's top side or on the wall's bottom side to the wall's bottom side, or respectively to the wall's top side.

In some embodiments, the wall's height extending from the wall's bottom side to the wall's top side, i.e., the extension of the wall in the component vertical direction, decreases in the component longitudinal direction. In other words, the wall tapers in the component longitudinal direction i.e., from the first to the second end face. In some embodiments, the wall's bottom side extends in the component longitudinal direction, wherein the wall's top side is inclined relative thereto. In particular, the structural component may thereby beneficially be designed lighter, wherein the wall and accordingly the structural component is rigid due to the bead and/or rib that is also inclined relative to the component longitudinal direction.

In some embodiments, a support element is molded onto the wall's top side of the wall. Alternatively and in some embodiments, the support element is only fastened to the wall's top side. This assumes in particular a bearing function for a housing cover of the battery housing. For example, mounting contours are also arranged in or on or introduced into the support element. For example, the support element has a (screw) seat for a screw for fastening the housing cover, or forms a plug-in contour for an appropriately corresponding (mating) contour on the housing cover.

In some embodiments, a projection, elevated like a dome is molded on to the wall. For example, the projection on the wall may be molded on in the region of the first or the second end face, i.e., the end relative to the component longitudinal direction. The projection may extend beyond the rib, or respectively the bead. The projection enables the structural component to be mounted in the battery housing, in particular on the housing floor, and additionally or alternatively to fasten battery modules of the battery. For a secure mounting and/or fastening of the battery module, a projection is, e.g., molded onto each of the two sides of the wall, both in the region of the first end face as well as in the region of the second end face.

The structural component may in some embodiments be a cast part, for example made of aluminum. Alternatively thereto and in some embodiments, the structural component is produced by forging. The structural component has a high functional integration, in particular in comparison to forming the structural component as an extrusion molded profile. Accordingly, projections in particular as well as the support elements may also be molded onto the wall monolithically, i.e., integrally, and coherently in the casting procedure, and suitably molded on as well. This makes it possible for the rib, or respectively the bead to be inclined relative to the component longitudinal direction, and for the wall height to be lower to save weight. High flexural rigidity may also be realized due to the bead and/or the rib.

In some embodiments, the battery housing is provided and configured for a (traction) battery of an electrically-driven motor vehicle. To accomplish this, the housing has a tray-shaped seat comprising the housing floor and a housing frame. Accordingly, the housing frame may be oriented perpendicular to the housing floor and has two parallel housing longitudinal sides (frame longitudinal sides) that are at a distance from each other, and two housing transverse sides (frame longitudinal sides) running transverse thereto. In doing so, the seat may form a housing interior. The housing interior may therefore be delimited by means of the housing floor and by means of the housing frame.

A number of structural components may for example be introduced into the housing interior in one of the above-described versions, wherein the component vertical direction runs perpendicular to the housing floor, i.e., the structural components are arranged perpendicular thereto. Furthermore, the structural components may be oriented perpendicular to the housing's longitudinal sides and thus parallel to the housing's transverse sides. In this case, the first end face of at least one of the structural components lies on each of the two housing longitudinal sides. This reduces the wall height of the wall of the structural component, proceeding from the adjacent housing longitudinal side, into the housing interior.

Moreover and in some embodiments, a longitudinal member is accommodated in the housing interior that runs parallel to the housing's longitudinal sides, and thus transverse to the structural components, and extends from one of the housing's transverse sides to the other. The second end face of the structural components may lie against the adjoining longitudinal member. The structural components as well as the longitudinal member may form a lattice-like structure, wherein battery modules of the (traction) battery are accommodated in the housing interior between the structural components, or respectively between the structural components and the housing frame.

A force generated from an accident or crash, for example, and acting on the housing frame is transmitted to the structural components that deflect (conduct) the force into the housing floor and into the longitudinal member. Moreover, due to the elevated flexural rigidity from the rib and/or the bead, kinking or bending of the end face of the wall of the corresponding structural component may be prevented, even with a comparatively large application of force thereupon. Especially, this may prevent damage to the battery modules of the battery arranged between the structural components, or at least significantly reduces the danger of such damage.

In some embodiments, an electrically-driven motor vehicle, in the following also referred to as a motor vehicle or electric vehicle for short, has a battery housing in one of the above-described versions. In particular in this case, a number of structural components are accommodated in the battery housing, wherein the walls of the structural components have a bead and/or a rib arranged on one side of the wall and oriented perpendicular thereto. In this case, the battery housing may be arranged in the motor vehicle such that the component longitudinal direction of the structural components arranged in the battery housing is parallel to a transverse direction of the vehicle that is also termed a Y direction. For this reason, the structural components are also termed cross members.

Accordingly in the event of a side crash, i.e., in the event of force applied in the vehicle transverse direction on the battery housing, in particular on account of the force-transmitting effect of the structural components and their lattice-like arrangement in the battery housing, the battery is protected in a relatively secure manner from damage.

In some embodiments, the motor vehicle has so-called rocker panels that extend in a longitudinal direction of the vehicle, also termed the X direction, i.e., from a rear to a front of the motor vehicle. The rocker panels are in particular arranged in the lower portion of the motor vehicle and are a component of the bodywork of the motor vehicle. The battery housing is arranged between the rocker panels. In this case, the rocker panels offer additional protection from deformation of the battery housing and damage to the battery due to the comparatively high rigidity.

Reference will now be made to the drawings in which the various elements of embodiments will be given numerical designations and in which further embodiments will be discussed.

Parts and designations that correspond to one another are provided with the same reference signs in all FIGS.

FIG. 1 shows an electromotively driven motor vehicle 2, also referred to in the following as a motor vehicle for short, in a schematic plan view. The vehicle longitudinal direction (X direction) and vehicle transverse direction (Y direction) of said motor vehicle are indicated by X and Y, respectively, in an accompanying directional diagram. The motor vehicle 2 has rocker panels 4 which are components of a bodywork (not shown in greater detail) of the motor vehicle 2. The rocker panels 4 are arranged in parallel with and at a distance from one another as well as at the floor (lower portion of the motor vehicle 2). The rocker panels 4 additionally extend in the vehicle longitudinal direction X.

Figure 2:
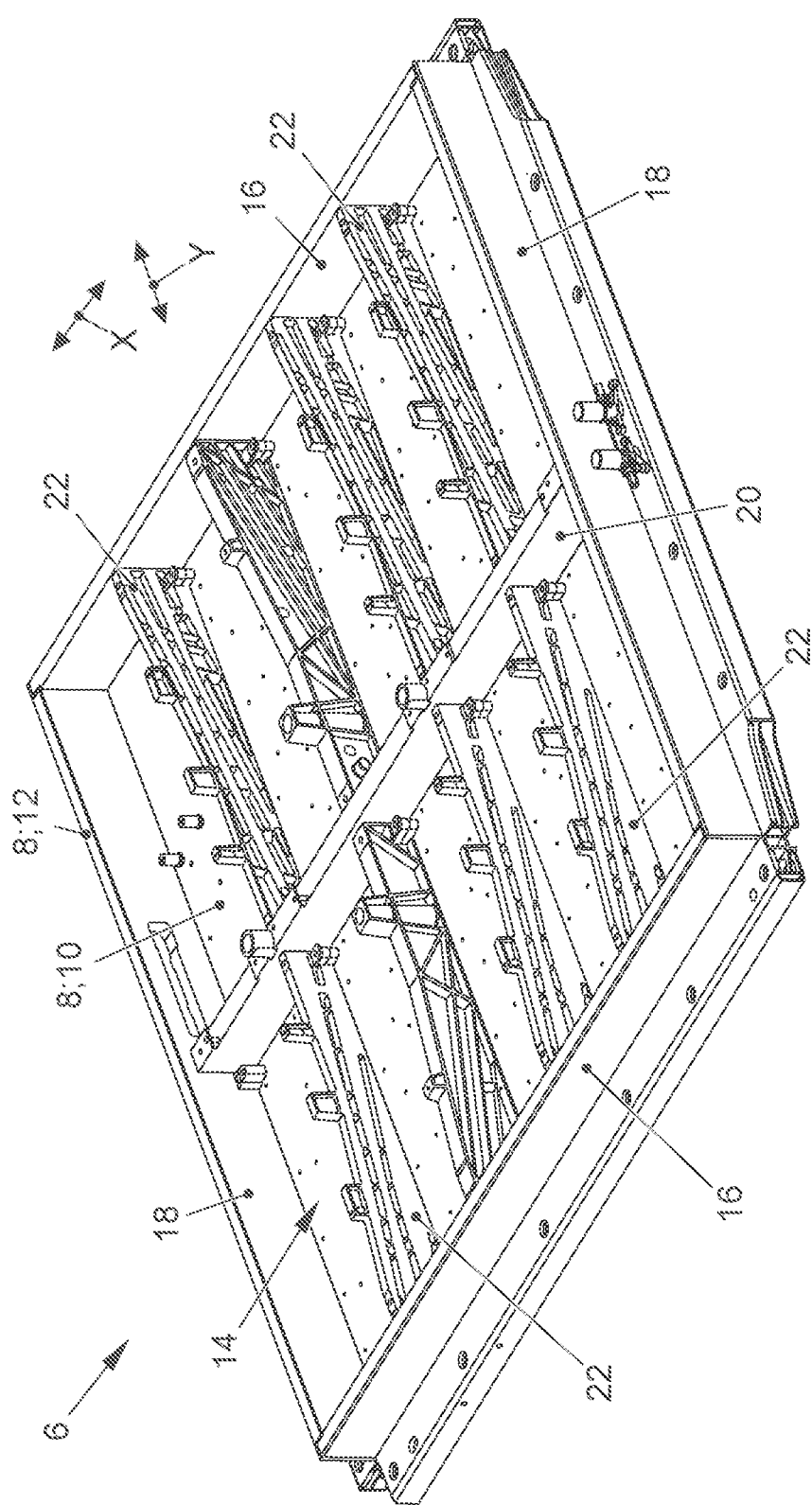
FIG. 2 shows a perspective representation of the battery housing with a tray-shaped seat that forms a housing interior, wherein a plurality of structural components are arranged in the housing interior.

A battery housing 6 is arranged between the rocker panels 4, which battery housing is shown in more detail in FIG. 2. The battery housing 6 has a tray-shaped seat 8 comprising a housing floor 10 and a housing frame 12. The seat 8 forms a housing interior 14. In other words, the seat 8 delimits the housing interior 14. The housing frame 12 in turn has two housing longitudinal sides 16 that extend in parallel with the rocker panels 4, i.e., in the vehicle longitudinal direction X, and two housing transverse sides that extend transversely thereto, i.e., in the vehicle transverse direction Y. A cuboid longitudinal member 20 is fitted in the housing interior 14 and is oriented in parallel with the housing transverse sides 16 and perpendicularly to the housing floor 10, the longitudinal member 20 extending from one of the housing transverse sides 18 to the other housing transverse side 18.

Figure 3:
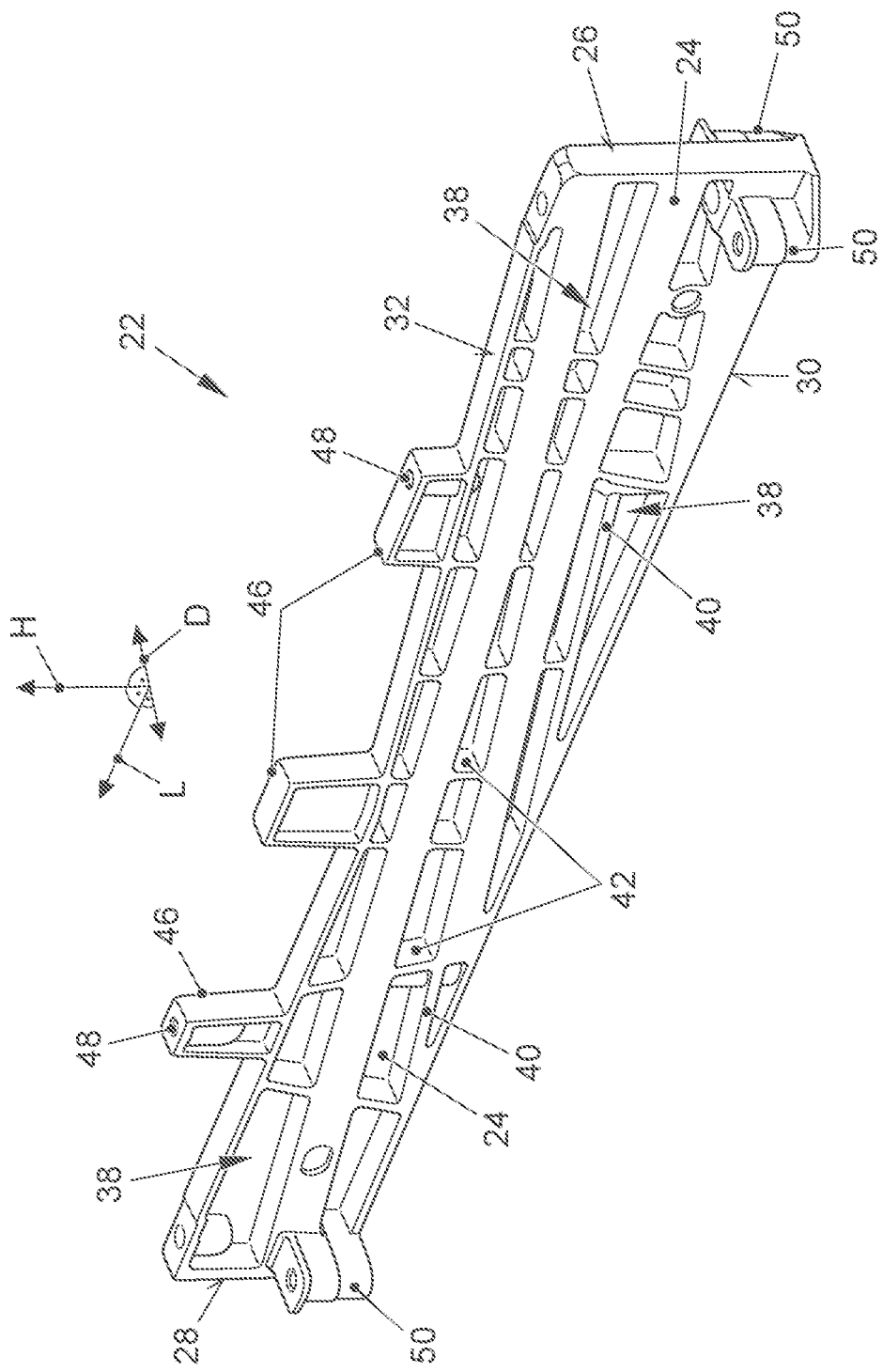
FIG. 3 shows a perspective representation of the structural component with a wall that has beads and ribs projecting on one side, and FIG. 4 schematically shows a cross-section of the structural component according to FIG. 3.
Figure 4:
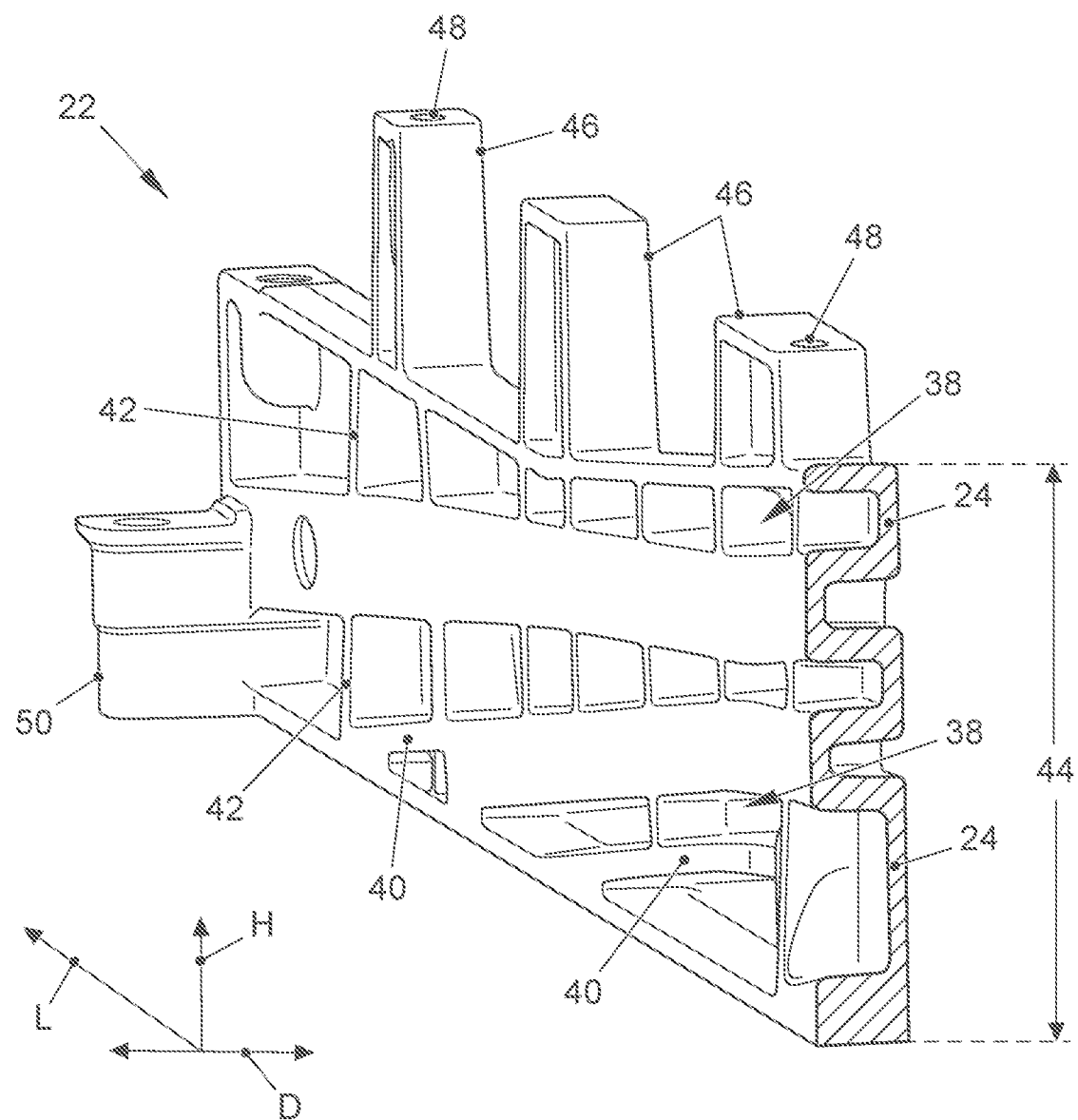

Furthermore, a number of structural components 22 are arranged in the housing interior 14. Each of the structural components 22 has a wall 24 that has a flat extension in a component vertical direction H and in a component longitudinal direction L as shown on an enlarged scale in FIGS. 3 and 4. The structural component 22 therefore extends in the component longitudinal direction L from a first end face 26 to a second end face 28, and in the component vertical direction H from a wall bottom side 30 to a wall top side 32, wherein in this case the extension in the component longitudinal direction L is greater than that in the component vertical direction H.

Each of the structural components 22 adjoins the corresponding housing longitudinal side 16 by means of the first end face 26 of its wall 24. The second end face 28 of the wall 24 of each of the structural components 22 adjoins the longitudinal member 20, and the wall bottom side 30 adjoins the housing top floor 10. The component vertical direction H runs perpendicular to the housing floor 10. The structural components 22 are oriented transversely to the housing longitudinal sides 16 and the longitudinal member 20. Accordingly, the structural components 22 extend in the vehicle transverse direction Y which is why the structural components 22 are also termed transverse members. The structural components 22 as well as the longitudinal member 20 form a lattice-like structure. Battery modules 34 represented by dashed lines are accommodated in the housing interior 14 between the structural components 22, or respectively between the structural components 22 and the housing frame 12 and form the (traction) battery 36.

The wall 24 of each structural component 22 has a number of beads 38 as well as a number of ribs 40, wherein the ribs 40 are arranged on one side of the wall 24 and are oriented perpendicular thereto. As discernible in FIG. 4, the wall 24 is formed with a meandering cross-section due to the beads 38. Such sections of the wall 24 that run in a cross-section in the component vertical direction H are alternatingly arranged on the outside with respect to a component thickness direction D perpendicular to the component vertical direction and to the component longitudinal direction L. Furthermore, the ribs 40 do not extend beyond the beads 38 in the component thickness direction D. In other words, the extension of the ribs 40 in the component thickness direction D is less than a depth of the beads 38 in this direction.

The beads 38 and the ribs 40 extend substantially in the component longitudinal direction L, i.e., from the first end face 26 to the second end face 28, wherein the ribs 40 as well as the beads 38 are at least sectionally inclined slightly toward the component longitudinal direction L.

The ribs 40 and the beads 38 have a dual function. Due to their inclination toward the housing floor 10, they cause a transmission of a force F acting on the first end face 26 of the wall 24 toward the wall bottom side 30. Moreover, the ribs 40 and the beads 38 serve to increase the flexural rigidity of the wall 24 and hence of the structural component 22.

In summary, the structural component 22 acts as a so-called force converter. It absorbs externally introduced forces and/or transmits them. The housing frame 12 is therefore braced against the structural components 22 in the event of force acting on the battery housing 6 in the vehicle transverse direction Y. Due to the force converting (force transmitting) effect of the structural components 22 adjoining the housing frame 14, the force F is transmitted into the housing floor 10 and into the longitudinal member 20. In this manner, the battery 36 is protected from an application of force and from corresponding damage. The force F in this case is represented by a corresponding arrow and is for example caused by a crash (side-impact, accident).

Vertical ribs 42 arranged on the wall 24 of the structural component 22 are oriented perpendicular thereto, extend substantially in the component vertical direction H and additionally increase flexural rigidity of the wall 24. In this case, the vertical ribs 42 extend along the entire extension of the wall 24 in the component vertical direction H, i.e., from the wall bottom side 30 to the wall top side 32, or only sectionally over a plurality of the ribs 38. The extension of the wall 24 in the component vertical direction H is also termed the wall height 44 in the following.

The wall height 44 of the walls 24 of each structural component 22 decreases in a weight-saving manner in its component longitudinal direction L from the first end face 26 to the second end face 28. The wall height 44 therefore decreases from the housing longitudinal side 16 against which the corresponding structural component 22 lies to the longitudinal member 20, i.e., to a middle of the housing interior 14. In this case, three upstanding support elements 46 are molded onto the wall top side 32 in the component vertical direction H for a housing cover (not shown). The first and third support element 46 with respect to the component longitudinal direction L each have a screw seat 48 for a screw for mounting the housing cover.

Molded onto the wall 24 of each structural component 22 are projections 50 that are elevated like a dome relative thereto and extend beyond the beads 38 and the rib 40 in the component thickness direction D. The projections 50 in this case are molded onto both sides of the wall 24 in the region of the first end face 26 and in the region of the second end face 28. In other words, the projections 50 are molded onto the end side with respect to the component longitudinal direction L and onto both sides of the wall 24. Moreover, the projections are molded onto the end side relative to the wall vertical direction H in the region of the wall bottom side 30, wherein the projections 50 are formed as a screw dome for mounting the corresponding structural component 22 on the housing floor 10 and for fastening the corresponding battery module 34.

The invention has been described in the preceding using various exemplary embodiments. The invention is not limited to the above-described exemplary embodiments. Rather, a person skilled in the art may also derive other versions of the invention herefrom without departing from the scope of the invention. In particular, all individual features described in connection with said exemplary embodiments may also be combined with one another in another way without departing from the scope of the invention.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

2 Motor vehicle
4 Rocker panel
6 Battery housing
8 Seat
10 Housing floor
12 Housing frame
14 Housing interior
16 Housing longitudinal side
18 Housing transverse side
20 Longitudinal member
22 Structural component
24 Wall
26 First end face
28 Second end face
30 Wall bottom side
32 Wall top side
34 Battery module
36 Battery
38 Bead
40 Rib
42 Vertical rib
44 Wall height
46 Support element
48 Screw seat
50 Projection
D Component thickness direction
F Force
H Component vertical direction
L Component longitudinal direction
X Vehicle longitudinal direction
Y Vehicle transverse direction

What is claimed is:

1. A structural component for a battery housing of an electrically-driven motor vehicle with a wall that extends from a wall bottom side to a wall top side in a component vertical direction, and from a first end face to a second end face in a component longitudinal direction perpendicular thereto,
    wherein the wall comprises one or more of a rib and a bead, arranged on one side of the wall and oriented perpendicular thereto to increase its flexural rigidity, and
    wherein the rib, or respectively the bead extends substantially in the component longitudinal direction, and wherein
    the rib, or respectively the bead is slightly inclined at least sectionally in the component longitudinal direction toward the wall bottom side of the wall.

2. The structural component according to claim 1, further comprising a vertical rib arranged on the wall and oriented perpendicular thereto, wherein the vertical rib extends substantially in the component vertical direction.

3. The structural component according to claim 2, wherein the wall height of the wall extending from the wall bottom side to the wall top side decreases in the component longitudinal direction.

4. The structural component according claim 2, further comprising a support element, wherein the support element is molded onto the wall top side of the wall.

5. The structural component according to claim 2, further comprising a projection elevated dome-like relative to the wall for mounting in a battery housing and/or for fastening a battery module of a battery, said projection being molded onto the wall in the region of the first end face or the second end face.

6. The structural component according to claim 1, wherein the wall height of the wall extending from the wall bottom side to the wall top side decreases in the component longitudinal direction.

7. The structural component according claim 6, further comprising a support element, wherein the support element is molded onto the wall top side of the wall.

8. The structural component according to claim 6, further comprising a projection elevated dome-like relative to the wall for mounting in a battery housing and/or for fastening a battery module of a battery, said projection being molded onto the wall in the region of the first end face or the second end face.

9. The structural component according claim 1, further comprising a support element, wherein the support element is molded onto the wall top side of the wall.

10. The structural component according to claim 9, further comprising a projection elevated dome-like relative to the wall for mounting in a battery housing and/or for fastening a battery module of a battery, said projection being molded onto the wall in the region of the first end face or the second end face.

11. The structural component according to claim 1, further comprising a projection elevated dome-like relative to the wall for mounting in a battery housing and/or for fastening a battery module of a battery, said projection being molded onto the wall in the region of the first end face or the second end face.

12. The structural component according to claim 2, further comprising a vertical rib arranged on the wall and oriented perpendicular thereto, wherein the vertical rib extends substantially in the component vertical direction.

13. The structural component according to claim 2, wherein the wall height of the wall extending from the wall bottom side to the wall top side decreases in the component longitudinal direction.

14. The structural component according claim 2, further comprising a support element, wherein the support element is molded onto the wall top side of the wall.

15. The structural component according to claim 2, further comprising a projection elevated dome-like relative to the wall for mounting in a battery housing and/or for fastening a battery module of a battery, said projection being molded onto the wall in the region of the first end face or the second end face.

16. A battery housing for a battery of an electrically-driven motor vehicle, comprising:
a tray-shaped seat having a housing floor and a housing frame, wherein the seat forms a housing interior,
a number of structural components arranged in the housing interior,
that are oriented perpendicular to the housing floor and perpendicular to two parallel housing longitudinal sides of the housing frame that are at a distance from each other,
wherein at least one of the structural components lies against each of the housing longitudinal sides,
wherein the wall height of their walls decreases starting from the corresponding housing longitudinal side,
wherein each of the number of structural components comprises:
a wall that extends from a wall bottom side to a wall top side in a component vertical direction, and from a first end face to a second end face in a component longitudinal direction perpendicular thereto,
wherein the wall comprises one or more of a rib and a bead, arranged on one side of the wall and oriented perpendicular thereto to increase its flexural rigidity, and
wherein the rib, or respectively the bead extends substantially in the component longitudinal direction.

17. The battery housing according to claim 16, further comprising a longitudinal member arranged in the housing interior transverse to the structural components against which the structural components lie.

18. An electrically-driven motor vehicle with a battery housing according to claim 16, wherein the component longitudinal direction of the structural components is parallel to a vehicle transverse direction.

19. The motor vehicle according to claim 18, further comprising rocker panels extending in a vehicle longitudinal direction, wherein the battery housing is arranged between the rocker panels.

20. The battery housing according to claim 16, wherein the rib, or respectively the bead is slightly inclined at least sectionally in the component longitudinal direction toward the wall bottom side of the wall.

21. A structural component for a battery housing of an electrically-driven motor vehicle with a wall that extends from a wall bottom side to a wall top side in a component vertical direction, and from a first end face to a second end face in a component longitudinal direction perpendicular thereto,
wherein the wall comprises a plurality of ribs and a plurality of beads to increase its flexural rigidity; wherein
the ribs are arranged on one side of the wall and oriented perpendicular thereto; wherein
the ribs, or respectively the beads extends substantially in the component longitudinal direction; and
wherein, due to the beads, the wall has a meandering cross-section.

* * * * *